(12) United States Patent
Huang et al.

(10) Patent No.: US 6,597,155 B2
(45) Date of Patent: Jul. 22, 2003

(54) HIGHLY EFFICIENT SELF-OSCILLATION BOOST DC/DC CONVERTER

(75) Inventors: Minchao Huang, Hangzhou (CN); Yi Chen, Hangzhou (CN)

(73) Assignee: Bel Fuse, Inc., Jersey City, NJ (US)

( * ) Notice: Subject to any disclaimer, the term of this patent is extended or adjusted under 35 U.S.C. 154(b) by 0 days.

(21) Appl. No.: 09/931,608

(22) Filed: Aug. 16, 2001

(65) Prior Publication Data

US 2002/0089861 A1 Jul. 11, 2002

(30) Foreign Application Priority Data

Aug. 16, 2000 (CN) ........................................ 00122441 A

(51) Int. Cl.[7] ............................................. G05F 1/613
(52) U.S. Cl. ........................ 323/222; 323/225; 323/272
(58) Field of Search ................................ 323/222, 223, 323/225, 271, 272, 282

(56) References Cited

U.S. PATENT DOCUMENTS

| | | | | |
|---|---|---|---|---|
| 3,974,439 A | * | 8/1976 | Holland | |
| 4,510,400 A | * | 4/1985 | Kitely | 323/222 |
| 4,514,679 A | * | 4/1985 | Schierjott | 323/222 |
| 4,999,566 A | * | 3/1991 | Kuehn | 323/222 |
| 5,233,287 A | * | 8/1993 | Lenk | 323/222 |
| 5,406,471 A | * | 4/1995 | Yamanaka | 323/271 |
| 5,844,399 A | * | 12/1998 | Stuart | 323/282 |
| 5,949,222 A | * | 9/1999 | Buono | 323/222 |
| 6,215,286 B1 | * | 4/2001 | Scoones et al. | 323/225 |
| 6,236,191 B1 | * | 5/2001 | Chaffai | 323/222 |
| 6,252,383 B1 | * | 6/2001 | Wittenbreder | 323/271 |

FOREIGN PATENT DOCUMENTS

CN   99108088.2   12/1999   .......... H02M/3/338

* cited by examiner

Primary Examiner—Jeffrey Sterrett
(74) Attorney, Agent, or Firm—Ostrolenk, Faber, Gerb & Soffen, LLP

(57) ABSTRACT

A self-oscillation DC-DC converter circuit which includes a first transistor electrically connected to an input positive terminal, a second transistor electrically connected to the first transistor and operable to pass a portion of a base current of the first transistor, and a circuit to steady the output voltage electrically connected between the second transistor and an output positive terminal. The output negative terminal is connected directly to the input negative terminal. The self-oscillation DC-DC converter circuit does not use an auxiliary turn, thereby allowing the use of NPN transistors. Positive feedback is achieved by a voltage change $V_{ce1}$ of the first transistor from a saturation state to a non-saturation state. In the non-saturation state, the second transistor is turned on, the first transistor is turned off and self-oscillation is achieved. With this construction, the self-oscillation DC-DC converter operates normally when the input voltage is lower than $5V_{dc}$.

28 Claims, 4 Drawing Sheets

HIGHLY EFFICIENT SELF-OSCILLATION BOOST DC/DC CONVERTER

BACKGROUND OF THE INVENTION

1. Field of the Invention

The present invention relates to DC-DC power converters. In particular, the present invention relates to a self-oscillating DC-DC power converter and circuit, and a method of self-oscillating a DC voltage.

2. Description of the Prior Art

Generally, a control IC is used to control a DC-DC power converter to convert an input DC voltage into a desired output DC voltage (either higher or lower than the input DC voltage). FIG. 1 is a schematic diagram of a circuit for a DC-DC converter controlled by an ASIC UC3842 to convert input DC voltage $V_{in}$ into output DC voltage $V_o$. This particular design circuit has some shortcomings. First, when the input voltage is lower than 5V, a DC-DC converter which utilizes an IC for a controller cannot be used because IC's do not work properly in low voltage input situations. Also, the use of an IC to control the circuit increases the overall cost of the circuit.

To overcome the above-mentioned drawbacks, a self-oscillation DC-DC converter (i.e., a BUCK DC-DC converter) has been proposed by the Chinese Patent No. 99108088.2. This BUCK DC-DC converter is shown in FIG. 2. As shown therein, the DC-DC converter includes a PNP transistor Q1, a primary turn L1, a diode D1 and a capacitor C2. An auxiliary turn L2 connects the base of transistor Q1 to the emitter of transistor Q1 through a capacitor C1 and a resistor R3. The circuit also includes a transistor Q2 which has its emitter and collector connected to the emitter and base of transistor Q1 to conduct a part of the base current for transistor Q1. Transistor Q2 decides whether transistor Q1 is on or off according to the change of output voltage. Therefore, this DC-DC converter keeps the output voltage steady via the use of transistor Q2.

This BUCK DC-DC converter does not adopt the use of an IC controller and is effective for use with a low input DC voltage. Further, since an IC is not used, it costs less to manufacture than that of the ASIC circuit of FIG. 1. However, this BUCK DC-DC converter has a few drawbacks. First, this BUCK DC-DC converter is only suitable with PNP transistors. This DC-DC converter is also only suitable for use where the output voltage is always lower than the input voltage, and cannot be applied for use as a BOOST DC-DC converter wherein the output voltage is higher than the input voltage. Moreover, because this BUCK DC-DC converter requires an auxiliary turn L2 to start oscillation, it requires numerous components and is difficult to manufacture.

Accordingly, there remains a need for a simple DC-DC converter which is self-oscillating and can be used effectively as a BOOST DC-DC converter.

SUMMARY OF THE INVENTION

The present invention is a self-oscillation DC-DC converter which utilizes a single turn inductor L1. In the circuit of the present invention, the input positive terminal of the DC source is connected to a terminal of the inductor L1. The other terminal of the inductor L1 is connected to the collector of a transistor Q1 and the anode of a diode D1. One terminal of a capacitor C1 is connected to the output positive terminal $V_{o+}$ and the other terminal of capacitor C1 is connected to the output negative terminal $V_{o-}$. The input negative terminal of the DC source is directly connected to the output negative terminal. The base of transistor Q1 is connected to the input positive terminal of the DC source through a resistor R1. The emitter of the transistor Q1 is connected to the input negative terminal of the DC source. A second transistor Q2 is also provided. The collector of transistor Q2 is connected to the base of transistor Q1 and the emitter of second transistor Q2 is connected to the emitter of transistor Q1. The base of transistor Q2 is connected to the collector of transistor Q1 through a resistor R2.

The self-oscillation DC-DC converter circuit described herein does not use an auxiliary turn, thereby allowing the use of NPN transistors. Positive feedback is achieved by a voltage change $V_{ce1}$ of the transistor Q1 from a saturation state to a non-saturation state. In the non-saturation state, the transistor Q2 is turned on, the transistor Q1 is turned off and self-oscillation is achieved. The self-oscillation DC-DC converter according to the present invention operates normally when the input voltage is lower than $5V_{dc}$. Also, the use of fewer components lowers the overall cost of the circuit and enables a decreased size circuit to be produced.

The self-oscillation DC-DC converter circuit of the present invention uses relatively few components, thereby decreasing the cost to manufacture and decreasing the overall size required of the circuit. Moreover, the self-oscillation DC-DC converter works when the input voltage is lower than $5V_{dc}$.

A further embodiment is also disclosed wherein power loss is reduced and overall efficiency of the circuit is increased by the addition of a power amplifier driver circuit and a power stage to create a self-oscillation BOOST DC-DC converter.

The power amplifier driver circuit added in the further embodiment of the present invention preferably comprises an NPN transistor Q3, resistors R4, R5 and a capacitor C2. The power stage of the self-oscillation BOOST DC-DC converter includes a high power transistor Q4, an inductor L2, a diode D2 and a capacitor C3. The power amplifier driver circuit amplifies the power of the voltage (pulse signal $V_{ce1}$) from the collector to the emitter of transistor Q1 to drive the high power transistor Q4. Resistor R4 and capacitor C2 trim the pulse signal $V_{ce1}$. Transistor Q4 boosts the input voltage to a higher output voltage. When transistor Q4 is turned on, inductor L2 is charged. When transistor Q4 is turned off, the charge stored in inductor L2 is discharged to output. The high power transistor Q4 is preferably a power MOSFET and reduces power dissipation.

With the addition of the power amplifier driver circuit and the high power transistor, the self-oscillation DC-DC converter of the present invention is adapted to be a self-oscillation BOOST DC-DC converter. Accordingly, a highly efficient self-oscillation BOOST DC-DC converter is achieved.

BRIEF DESCRIPTION OF THE DRAWINGS

Other features and advantages of the present invention will become apparent from the following description of the invention which refers to the accompanying drawings, wherein.

DETAILED DESCRIPTION OF EMBODIMENTS OF THE INVENTION

Figure 1:
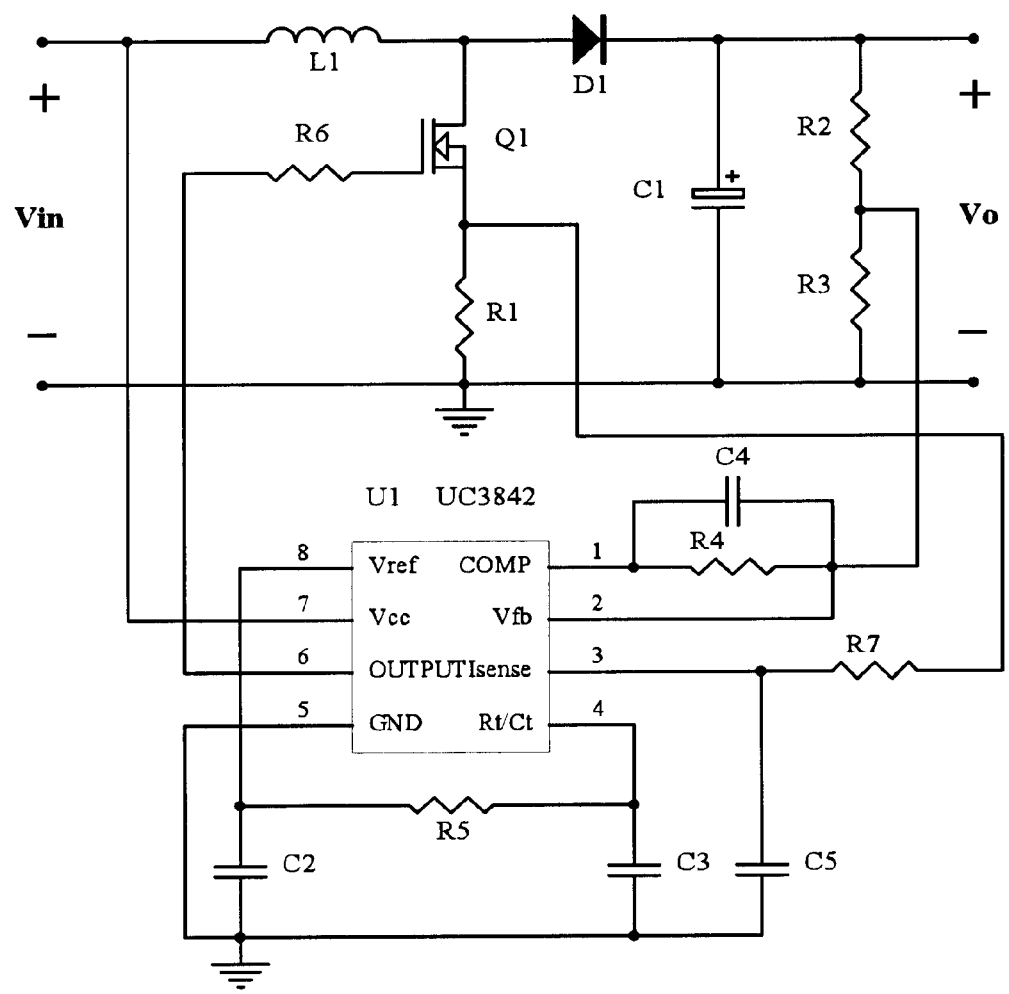
FIGS. 1 and 2 are schematic diagram of prior art DC-DC converter circuits.
Figure 2:
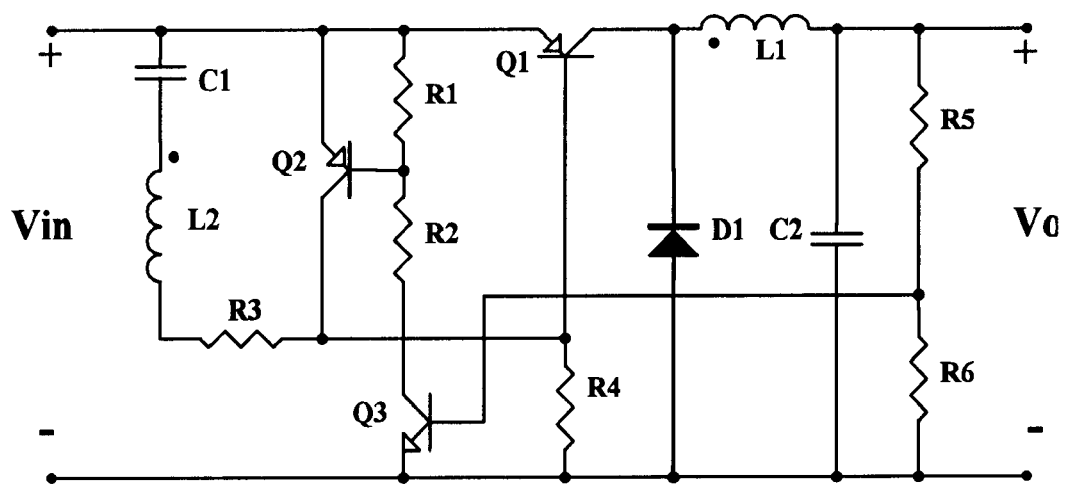
Figure 3:
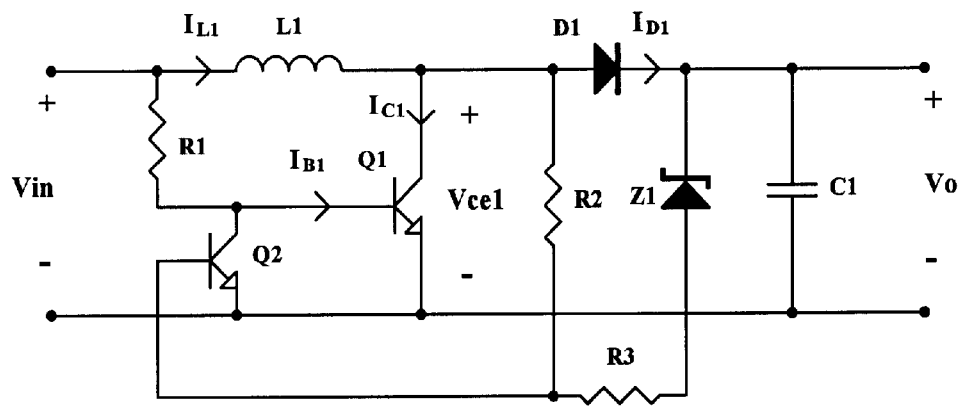
FIG. 3 is schematic diagram of a DC-DC converter circuit according to a first embodiment of the present invention.

Referring now to the drawings, FIG. 3 shows a self-oscillation DC-DC converter circuit in accordance with the present invention where there is no auxiliary turn.

In the circuit of FIG. 3, the input positive terminal of a DC source is connected to a terminal of the inductor L1. The DC source can be a direct DC source such as a battery, or a DC output from an AC-DC converter. The other terminal of the inductor L1 is connected to the collector of a transistor Q1 and the anode of a diode D1. One terminal of a capacitor C1 is connected to the output positive terminal $V_{o+}$ and the other terminal of capacitor C1 is connected to the output negative terminal $V_{o-}$. The input negative terminal of the DC source is directly connected to the output negative terminal. The base of transistor Q1 is connected to the input positive terminal of the DC source through a resistor R1. The emitter of the transistor Q1 is connected to the input negative terminal of the DC source.

A second transistor Q2 is also provided. The collector of transistor Q2 is connected to the base of transistor Q1 and the emitter of second transistor Q2 is connected to the emitter of transistor Q1. The base of transistor Q2 is connected to the collector of transistor Q1 through a resistor R2. Preferably, the transistor Q2 connected between the base and emitter of the transistor Q1 operates to pass a portion of the base current of transistor Q1 base current. With this arrangement, the voltage stress on transistor Q2 is not high. Preferably, a low-power transistor is utilized to reduce the converter size and cost. Also, transistors Q1 and Q2 are preferably NPN transistors.

With the above arrangement of circuit components, when the input voltage or load changes, the output voltage of the converter may become unsteady because the transistor Q2 base current influences that of transistor Q1. To keep the output voltage steady when the input voltage changes, a circuit to steady the output voltage is preferably added between the base of transistor Q2 and the output positive terminal. The circuit to steady the output voltage preferably comprises a zener diode Z1 and a resistor R3. The cathode of the zener diode Z1 is connected to the output positive terminal while its anode is connected to the base of transistor Q2 through a resistor R3.

With the foregoing components, a highly efficient self-oscillation DC-DC converter is achieved. Moreover, the self-oscillation DC-DC converter operates efficiently when the input voltage is lower than $5V_{dc}$.

The above-described self-oscillation DC-DC converter circuit of the present invention can be applied to a BOOST DC-DC power converter (as will be described in detail below with reference to FIG. 5), a battery charger, a self-oscillation driver, etc. The modifications required to adapt the self-oscillation DC-DC converter circuit for use in various applications will be readily apparent given the detailed description provided herein.

Figure 4:
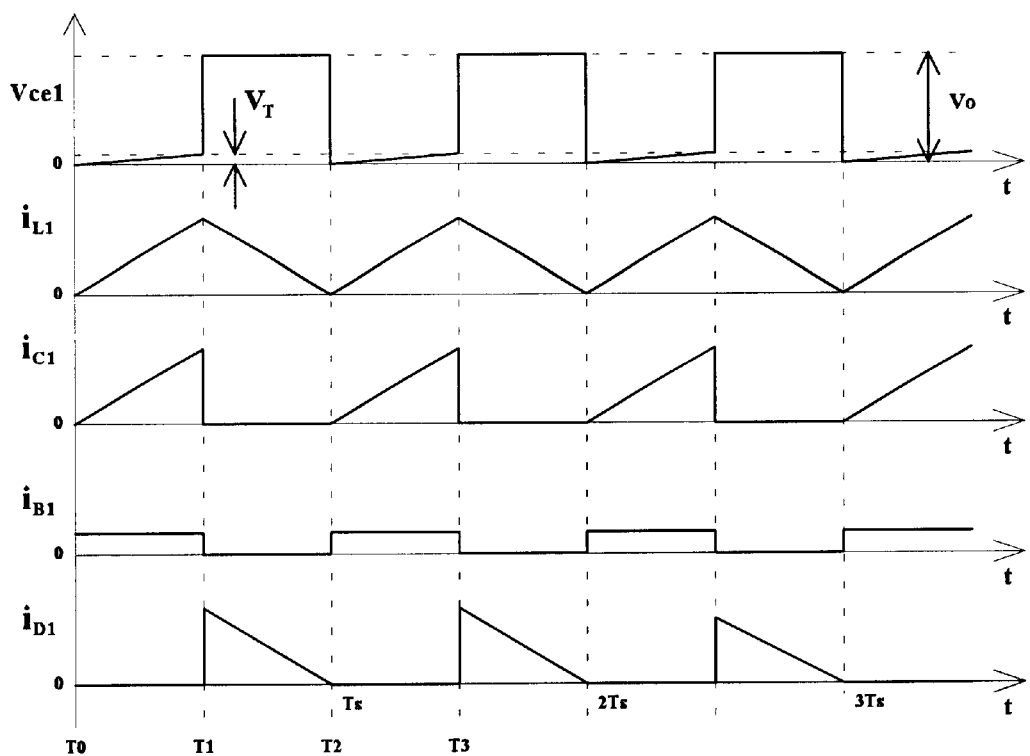
FIG. 4 is a graph showing the waveforms of the circuit of FIG. 3.

FIG. 4 shows the main waveforms of the above-described self-oscillation DC-DC converter. The operation, as described at certain points of time, is as follows:

At Time T0 to T1

The base current $i_{B1}$ drives the transistor Q1 through the resistor R1. When the transistor Q1 is in a saturated state, the voltage $V_{ce1}$ from the collector of the transistor Q1 to its emitter is about 0.3V and the transistor Q2 and diode D1 are off. The input voltage $V_{in}$, the inductor L1 and the transistor Q1 comprise a loop. Because of this loop, the current $I_{L1}$ of the inductor L1 rises linearly and the inductor L1 stores energy.

At Time T1 to T2

When the current $I_{L1}$ is equal to $\beta I_{B1}$, transistor Q1 changes its working status from a saturated state to an unsaturated state. At the same time, the voltage $V_{ce1}$ rises accordingly.

Since the base of transistor Q2 is connected to the collector of transistor Q1, transistor Q2 will be on when the voltage $V_{ce1}$ rises to a threshold voltage $V_T$, which, in turn, reduces the base current $I_{B1}$ of transistor Q1. The decrease of the base current $I_{B1}$ accelerates the rise of the voltage $V_{ce1}$ and increases the base current of the transistor Q2. This increase of the base current of transistor Q2 operates to switch off the transistor Q1.

When transistor Q1 is switched off, the current of the inductor L1 is transferred from the transistor Q1 to the diode D1. The energy stored in the inductor L1 is released to a load (not shown) through the loop that comprises the input voltage $V_{in}$, the inductor L1, the diode D1, the capacitor C1 and the load.

In the period that the current $I_{L1}$ of the inductor L1 is decreased to zero, the diode D1 and the transistor Q2 remain on and the transistor Q1 remains off.

At Time T2 to T3

When the inductor current $I_{L1}$ is zero (at T2 of FIG. 4), the diode D1 and the transistor Q2 are turned off and the transistor Q1 is turned on. At this time, the circuit comes to its next oscillation period, i.e., repeats the oscillation described above in connection with times T0 to T1 and T1 to T2.

Figure 5:
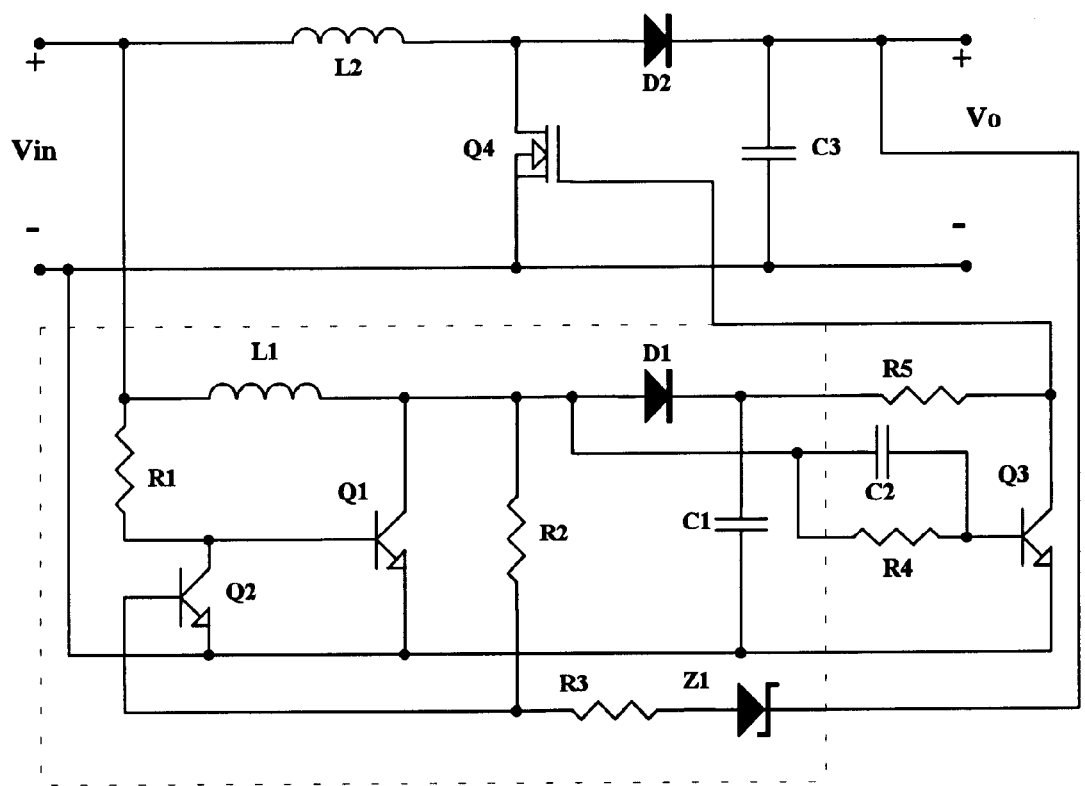
FIG. 5 is a schematic diagram of a BOOST DC-DC converter circuit according to a second embodiment of the present invention.

FIG. 5 shows another embodiment of the invention. The circuit enclosed within the dashed lines is the same as the above-described self-oscillation DC-DC converter circuit shown in FIG. 3. Therefore, the same components are assigned the same designators and will not be described in detail.

In the circuit shown in FIG. 5, a power amplifier driver circuit and a power stage are added to the self-oscillation DC-DC converter circuit described above with reference to FIG. 3 to form a self-oscillation BOOST DC-DC converter.

The power amplifier driver circuit preferably comprises an NPN transistor Q3, resistors R4, R5 and a capacitor C2. The power stage of the self-oscillation BOOST DC-DC converter includes a high power transistor Q4, an inductor L2, a diode D2 and a capacitor C3. In this embodiment, the pulse signal $V_{ce1}$ drives the high power transistor Q4 through the power amplifier driver circuit.

The power amplifier driver circuit amplifies the power of the voltage (pulse signal $V_{ce1}$) from the collector to the emitter of transistor Q1 to drive the high power transistor Q4. When transistor Q4 is turned on, inductor L2 is charged. When transistor Q4 is turned off, the charge stored in inductor L2 is discharged to output. Accordingly, an output voltage $V_o$ that is higher than the input voltage $V_{in}$ can be achieved. Resistor R4 and capacitor C2 trim and reshape the voltage $V_{ce1}$. The high power transistor Q4 is preferably a power MOSFET and reduces power dissipation.

Similar to the circuit of FIG. 3, a circuit to steady the output voltage is preferably added between the base of transistor Q2 and the output positive terminal. The circuit to steady the output voltage preferably comprises a zener diode Z1 and a resistor R3. The operation of the diode Z1 and the resistor R3 are the same as that of the circuit shown in FIG. 3.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A self-oscillation DC-DC converter circuit comprising:
   a first loop comprising:
      input voltage terminals;
      a first inductor; and
      a first transistor;
   a second loop comprising:
      the first inductor;
      a second transistor; and
      output terminals,
   the first transistor and the second transistor having respective emitters which are connected directly together and being arranged such that during a first period of a cycle the first transistor is on and the second transistor is off so that current flows in the first loop to store energy in the first inductor, and during a second period of the cycle the second transistor is on to bypass base current from the first transistor and the first transistor is off to release energy stored in the first inductor to the output terminals through the second loop.

2. The self-oscillation DC-DC converter circuit according to claim 1, further comprising a capacitor connected across the output terminals.

3. The self-oscillation DC-DC converter circuit according to claim 1, wherein:
   a collector of the first transistor is connected to the first inductor;
   a base of the first transistor is connected to a positive input terminal; and
   an emitter of the first transistor is connected to a negative input terminal.

4. The self-oscillation DC-DC converter circuit according to claim 1, further comprising a circuit to steady the output voltage in the second loop.

5. The self-oscillation DC-DC converter circuit according to claim 4, wherein the circuit to steady the output voltage includes a zener diode.

6. The self-oscillation DC-DC converter circuit according to claim 5, wherein the zener diode is connected to the second transistor.

7. A self-oscillation DC-DC converter circuit comprising:
   a first loop comprising:
      input voltage terminals;
      a first inductor; and
      a first transistor;
   a second loop comprising:
      the first inductor;
      a second transistor; and
      output terminals,
   wherein the first transistor and the second transistor have respective emitters which are connected directly together and are arranged such that during a first period of a cycle the first transistor is on and the second transistor is off so that current flows in the first loop to store energy in the first inductor, and during a second period of the cycle the first transistor is off and the second transistor is on to release energy stored in the first inductor to the output terminals through the second loop,
   a collector of the first transistor is connected to the first inductor;
   a base of the first transistor is connected to a positive terminal input voltage terminal; and
   an emitter of the first transistor is connected to a negative input voltage terminal;
   a collector of the second transistor is connected to the base of the first transistor;
   an emitter of the second transistor is connected to the emitter of the first transistor; and
   a base of the second transistor is connected to the collector of the first transistor.

8. The self-oscillation DC-DC converter circuit according to claim 7, wherein the first and second transistors are NPN transistors.

9. A self-oscillation DC-DC converter circuit comprising:
   a first loop comprising:
      input voltage terminals;
      a first inductor; and
      a first transistor;
   a second loop comprising:
      the first inductor;
      a second transistor; and
      output terminals,
   the first transistor and the second transistor being arranged such that during a first period of a cycle the first transistor is on and the second transistor is off so that current flows in the first loop to store energy in the first inductor, and during a second period of the cycle the first transistor is off and the second transistor is on to release energy stored in the first inductor to the output terminals through the second loop, and
   a power amplifier driver circuit and a power stage, the driver circuit and the power stage operable to increase an output voltage relative to an input voltage.

10. The self-oscillation DC-DC converter circuit according to claim 9, wherein the power stage comprises:
    a third loop including:
       the input voltage terminals;
       a second inductor; and
       a third transistor;
    a fourth loop including:
       the input voltage terminals;
       the second inductor; and
       the output voltage terminals,
    the third transistor being arranged such that when the third transistor is turned on current flows in the third loop to store energy in the second inductor, and when the third transistor is turned off the energy stored in the second inductor is released to the output terminals through the fourth loop.

11. The self-oscillation DC-DC converter circuit according to claim 10, wherein the third transistor is a power MOSFET.

12. The self-oscillation DC-DC converter circuit according to claim 10, wherein the power amplifier driver circuit comprises a fourth transistor, the fourth transistor amplifying a voltage from the first transistor so as to drive the third transistor.

13. The self-oscillation DC-DC converter circuit according to claim 12, wherein the fourth transistor amplifies the voltage from a collector to an emitter of the first transistor so as to turn the third transistor on and off.

14. The self-oscillation DC-DC converter circuit according to claim 9, wherein the power amplifier driver circuit is further operable to trim the voltage from the collector to the emitter of the first transistor.

15. A self-oscillation DC-DC converter circuit comprising:
   an input positive terminal;
   an input negative terminal;
   an output positive terminal;
   an output negative terminal connected directly to the input negative terminal;
   a first transistor electrically connected to the input positive terminal;
   a first inductor electrically connected between the input positive terminal and the first transistor;
   a diode electrically connected between the inductor and the output positive terminal;
   a capacitor electrically connected between the output positive terminal and the output negative terminal;
   a second transistor, the first and second transistors having respective emitters;
   the second transistor being electrically connected to the first transistor such that their respective emitters are directly connected together and such that the second transistor is operable to pass a portion of a base current of the first transistor; and
   a circuit to steady the output voltage electrically connected between the second transistor and the output positive terminal.

16. The self-oscillation DC-DC converter circuit according to claim 15, wherein:
   a collector of the first transistor is connected to the inductor;
   a base of the first transistor is connected to the input positive terminal; and
   an emitter of the first transistor is connected to the input negative terminal.

17. The self-oscillation DC-DC converter circuit according to claim 16, wherein:
   a collector of the second transistor is connected to the base of the first transistor;
   an emitter of the second transistor is connected to the emitter of the first transistor; and
   a base of the second transistor is connected to the collector of the first transistor.

18. The self-oscillation DC-DC converter circuit according to claim 17, wherein the first and second transistors are NPN transistors.

19. The self-oscillation DC-DC converter circuit according to claim 18, wherein the circuit to steady the output voltage comprises a zener diode.

20. The self-oscillation DC-DC converter circuit according to claim 19, wherein a cathode of the zener diode is connected to the output positive terminal and an anode of the zener diode is connected to the base of the second transistor.

21. A self-oscillation method, comprising:
   during a first part of an oscillation period:
      (1) placing a first transistor in a saturated state;
      (2) turning off a second transistor when the first transistor is in the saturated state;
      the first transistor and the second transistor having respective emitters which are directly connected together and being arranged in a loop with an inductor so as to store energy in the inductor; and
   during a second part of the oscillation period:
      (3) changing the first transistor to an unsaturated state;
      (4) turning on the second transistor when the first transistor is in the unsaturated state; and
      (5) turning off the first transistor when the second transistor is turned on so as to achieve self-oscillation.

22. The self-oscillation method according to claim 21, further comprising repeating steps (1) through (5) for a plurality of oscillation periods.

23. A self-oscillation DC-DC converter circuit comprising:
   an input positive terminal;
   an input negative terminal;
   an output positive terminal;
   an output negative terminal connected directly to the input negative terminal;
   a first transistor electrically connected to the input positive terminal;
   a first inductor electrically connected between the input positive terminal and the first transistor;
   a diode electrically connected between the inductor and the output positive terminal;
   a capacitor electrically connected between the output positive terminal and the output negative terminal;
   a second transistor electrically connected to the first transistor, the second transistor operable to pass a portion of a base current of the first transistor;
   a circuit to steady the output voltage electrically connected between the second transistor and the output positive terminal; and
   a power amplifier driver circuit and a power stage, the driver circuit and the power stage operable to increase an output voltage relative to an input the output terminals through the fourth loop.

24. The self-oscillation DC-DC converter circuit according to claim 23, wherein the power stage comprises:
   a third transistor electrically connected to the input positive terminal;
   a second inductor electrically connected between the input positive terminal and the third transistor; and
   a diode electrically connected between the inductor and the output positive terminal.

25. The self-oscillation DC-DC converter circuit according to claim 24, wherein the power amplifier driver circuit comprises a fourth transistor electrically connected between the first transistor and the third transistor, the fourth transistor operable to amplify a voltage from the first transistor so as to drive the third transistor.

26. The self-oscillation DC-DC converter circuit according to claim 25, wherein the fourth transistor amplifies the voltage from a collector to an emitter of the first transistor so as to turn the third transistor on and off.

27. The self-oscillation DC-DC converter circuit according to claim 24, wherein the third transistor is a power MOSFET.

28. The self-oscillation DC-DC converter circuit according to claim 23, wherein the power amplifier driver circuit is further operable to trim the voltage from the collector to the emitter of the first transistor.

* * * * *